(12) United States Patent
Corlett et al.

(10) Patent No.: US 9,840,370 B2
(45) Date of Patent: Dec. 12, 2017

(54) GRIPPER ATTACHMENT

(75) Inventors: Rick Corlett, Cedarburg, WI (US); Mike Chin, Baltimore, MD (US); Dean A. Wieting, West Allis, WI (US)

(73) Assignee: REXNORD INDUSTRIES, LLC, Milwaukee, WI (US)

( * ) Notice: Subject to any disclaimer, the term of this patent is extended or adjusted under 35 U.S.C. 154(b) by 637 days.

(21) Appl. No.: 13/994,263

(22) PCT Filed: Dec. 17, 2010

(86) PCT No.: PCT/US2010/060965
§ 371 (c)(1),
(2), (4) Date: Jun. 14, 2013

(87) PCT Pub. No.: WO2012/082137
PCT Pub. Date: Jun. 21, 2012

(65) Prior Publication Data
US 2013/0277176 A1  Oct. 24, 2013

(51) Int. Cl.
| | | |
|---|---|---|
| *B65G 15/42* | (2006.01) | |
| *B65G 19/24* | (2006.01) | |
| *B65G 15/14* | (2006.01) | |
| *B65G 17/44* | (2006.01) | |
| *B65G 37/00* | (2006.01) | |
| *B65G 15/58* | (2006.01) | |

(52) U.S. Cl.
CPC .............. *B65G 15/42* (2013.01); *B65G 15/14* (2013.01); *B65G 15/58* (2013.01); *B65G 17/44* (2013.01); *B65G 19/24* (2013.01); *B65G 37/005* (2013.01); *B65G 2201/0244* (2013.01)

(58) Field of Classification Search
CPC .......... B65G 15/14; B65G 15/42; B65G 19/24
USPC ...... 198/604, 606, 620, 626.1, 626.2, 699.1, 198/803.14, 803.15
See application file for complete search history.

(56) References Cited

U.S. PATENT DOCUMENTS

| 4,537,301 A | 8/1985 | Bavelloni |
| 4,798,281 A | 1/1989 | Egger |
| 5,000,311 A * | 3/1991 | Abbestam et al. ...... 198/867.14 |
| 5,219,065 A * | 6/1993 | Hodlewsky et al. ......... 198/853 |
| 5,429,226 A | 7/1995 | Ensch et al. |
| 6,772,876 B2 * | 8/2004 | Spangenberg ........... 198/867.02 |
| 7,032,737 B2 * | 4/2006 | Egger .......................... 198/405 |

FOREIGN PATENT DOCUMENTS

EP  1232966 A1  8/2002

OTHER PUBLICATIONS

International Search Report and Written Opinion dated Sep. 6, 2011 in connection with PCT/US2010/06095.

* cited by examiner

*Primary Examiner* — Leslie A Nicholson, III
(74) *Attorney, Agent, or Firm* — Quarles & Brady LLP

(57) ABSTRACT

A gripper (12) is disclosed having a base (24) that extends from a first end a second end and includes resilient (32) fingers that extend from the base between the first end and the second end. The resilient fingers (32) may be configured to generally conform to and engage with articles (34) being transferred when the base is mounted to a conveyor.

21 Claims, 6 Drawing Sheets

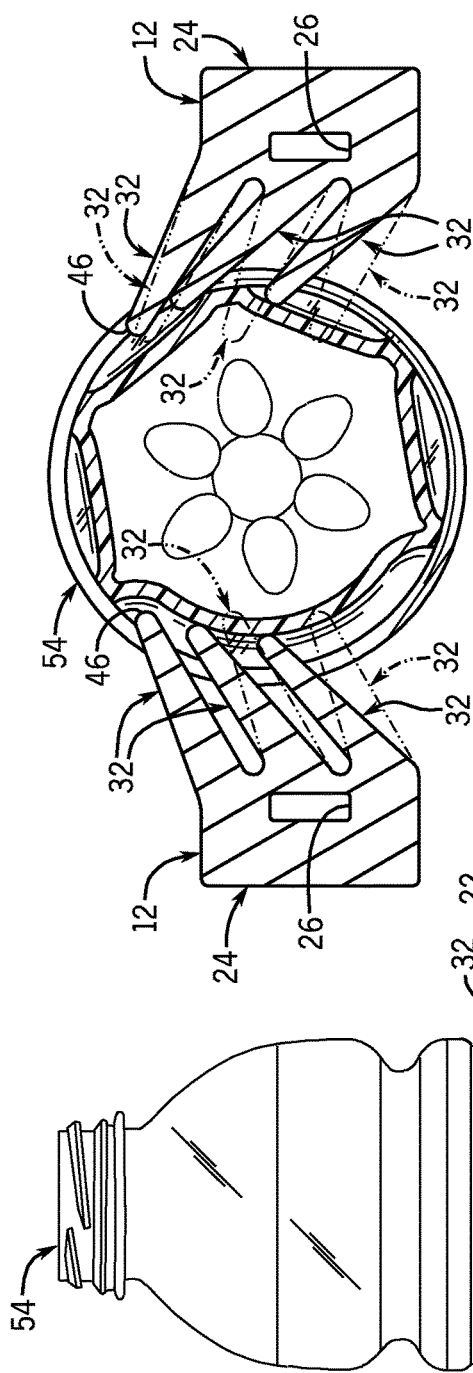
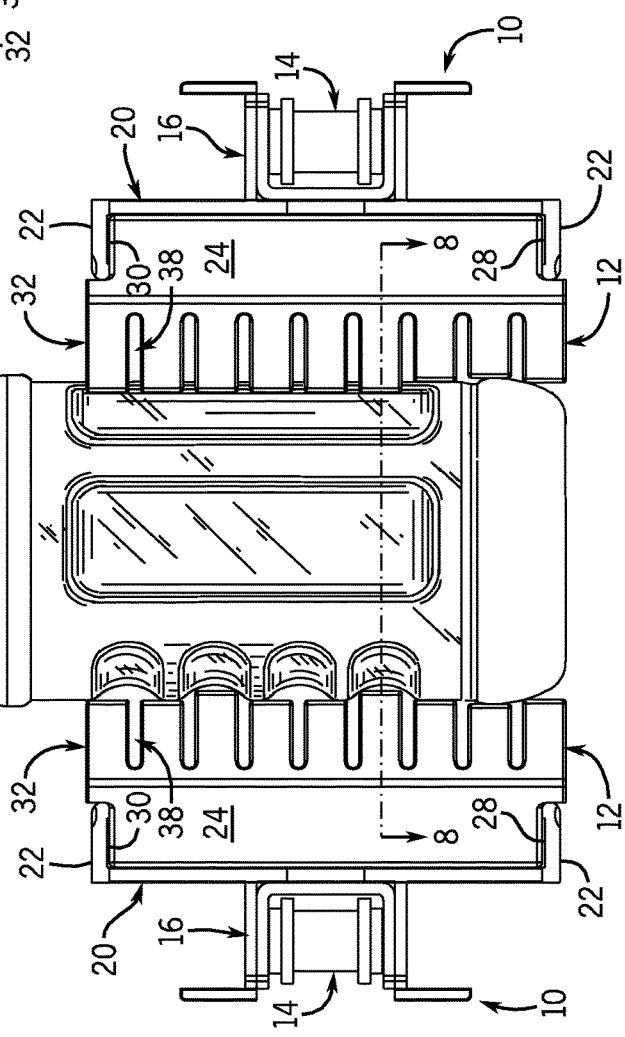
FIG. 7
FIG. 8

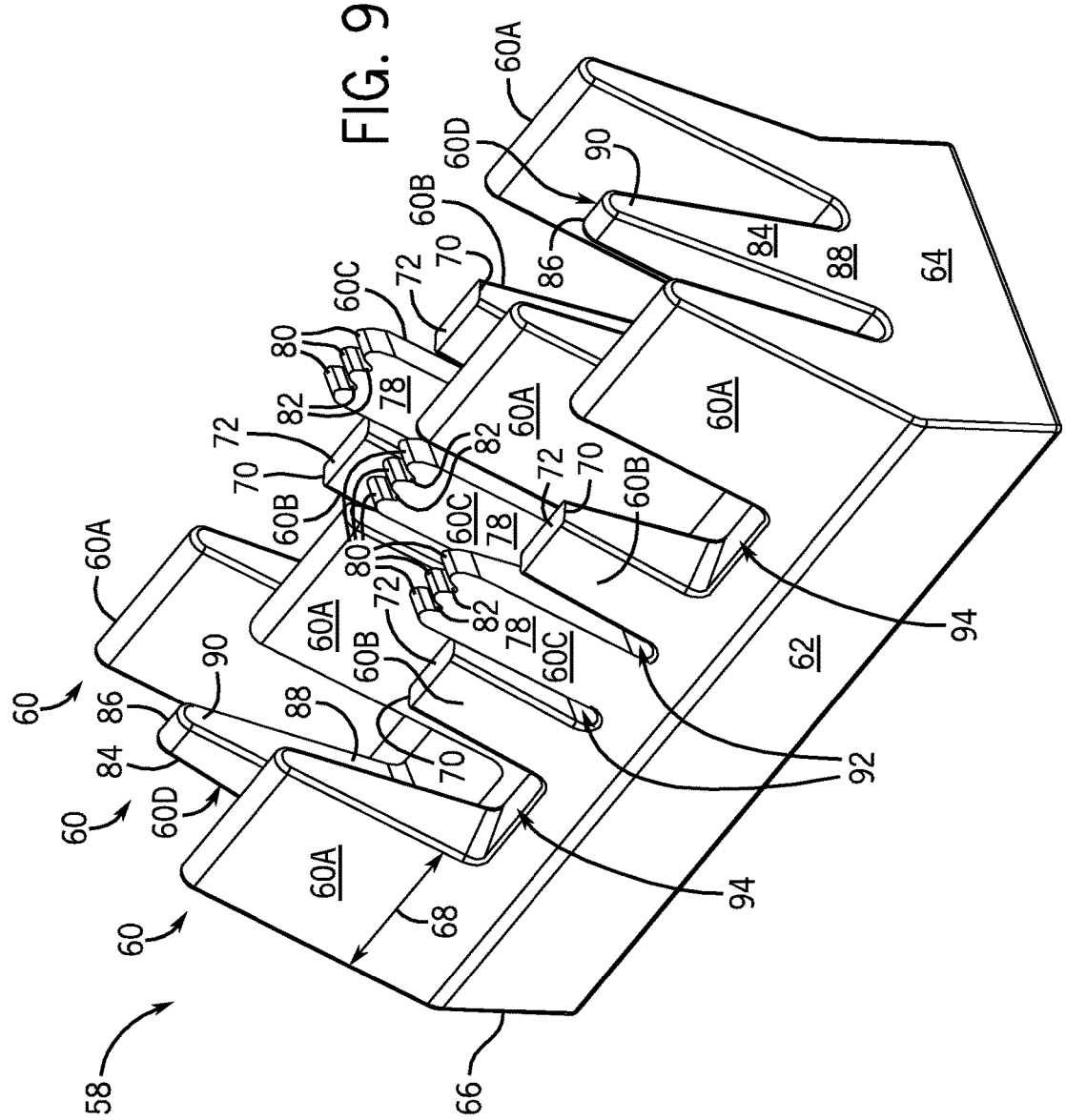

GRIPPER ATTACHMENT

CROSS-REFERENCE TO RELATED APPLICATIONS

This application represents the national stage entry of PCT International Application No. PCT/US2010/060965 filed Dec. 17, 2010. The contents of this application is hereby incorporated by reference as if set forth in its entirety herein.

STATEMENT REGARDING FEDERALLY SPONSORED RESEARCH

Not applicable.

BACKGROUND

The present disclosure relates generally to a gripper attachment that may be mounted to a conveyor. More particularly, the disclosure describes a gripper attachment having a plurality of resilient fingers that may be configured to accommodate the form factor of articles being conveyed.

Conveyors are typically used to transport articles (e.g., a bottle) from one location, for instance a filling station, to another location, such as a packaging area. In some circumstances, the path that the articles ride along as the conveyor moves undergoes a change in elevation, such as from a lower level to an upper level of a facility. As a result, articles of certain form factors can not be simply placed unrestrained on the conveyor as they may move relative to the conveyor where the path begins to incline or decline. This can result in a backup along the conveyor and/or damage to the articles being transported.

Several techniques have been developed to restrain articles placed upon conveyors. One approach involves the use of flights arranged on the conveyor generally perpendicular to the direction of travel. The flights are intended to form valleys and act as ledges for the articles as the path of the conveyor skews from horizontal. This approach, however, does not provide a secure engagement with the articles making its effectiveness at restraining the articles somewhat dependent upon the size and shape of the articles.

An alternative approach involves the use of parallel conveyors that merge toward each other to clamp an article positioned between the conveyors. In some forms, a gripper attachment is secured to the conveyors to aid engagement with the articles. However, to facilitate firm but not excessive engagement, the particular gripper is often tailored to engage a particular article. As a result, the rather limited applicability of a gripper impedes economical use of a single style gripper with articles having different form factors.

In light of at least the above considerations, a need exists for a gripper concept that may engage and conform to articles having distinct and/or complex form factors.

SUMMARY

A gripper attachment is disclosed having a base that extends from a first end to a second end, and includes resilient fingers that extend from the base between the first end and the second end. The resilient fingers may be configured to generally conform to and engage with articles being transferred when the base is mounted to a conveyor.

In one aspect, a gripper attachment is mountable on a chain and comprises a base extending from a first end to a second end. A first rib is integrally formed with the base and substantially extends between the first end of the base and the second end of the base. A first plurality of openings are spaced apart along the first rib and define a first plurality of resilient fingers between the first end of the base and the second end of the base. A second rib is integrally formed with the base and substantially extends between the first end of the base and the second end of the base. And, a second plurality of openings are spaced apart along the second rib and define a second plurality of resilient fingers between the first end of the base and the second end of the base.

In another aspect, a gripper attachment comprises a base that is mountable on a chain and extends from a first end to a second end. A plurality of resilient fingers extend from the base and are substantially aligned between the first end of the base and the second end of the base. Each of the plurality of resilient fingers defines a width that is less than a width defined between the first end of the base and the second end of the base.

In a further aspect, a gripper chain assembly comprises a first chain that is capable of traveling in a path direction. A first base is mounted to the first chain, and a first plurality of resilient fingers extend from the first base and are substantially aligned transversely to the path direction. A second chain is adjacent the first chain and is capable of traveling in the path direction. When an article is between the first plurality of resilient fingers and the second chain, the first plurality of resilient fingers flex to engage the article.

The above and other aspects of the concept will be apparent from the description that follows. In the detailed description, preferred example embodiments will be described with reference to the accompanying drawings. These embodiments do not represent the full scope of the invention; rather, the invention may be employed in many other embodiments. Reference should therefore be made to the claims for determining the full breadth of the invention.

BRIEF DESCRIPTION OF THE DRAWINGS

FIG. 7 is a partial front view along line 7-7 shown in FIG. 6.

FIG. 8 is a partial section view along line 8-8 shown in FIG. 7.

FIG. 9 is a front isometric view of an alternative example gripper attachment.

DETAILED DESCRIPTION OF THE PREFERRED EXAMPLE EMBODIMENT

Figure 1:
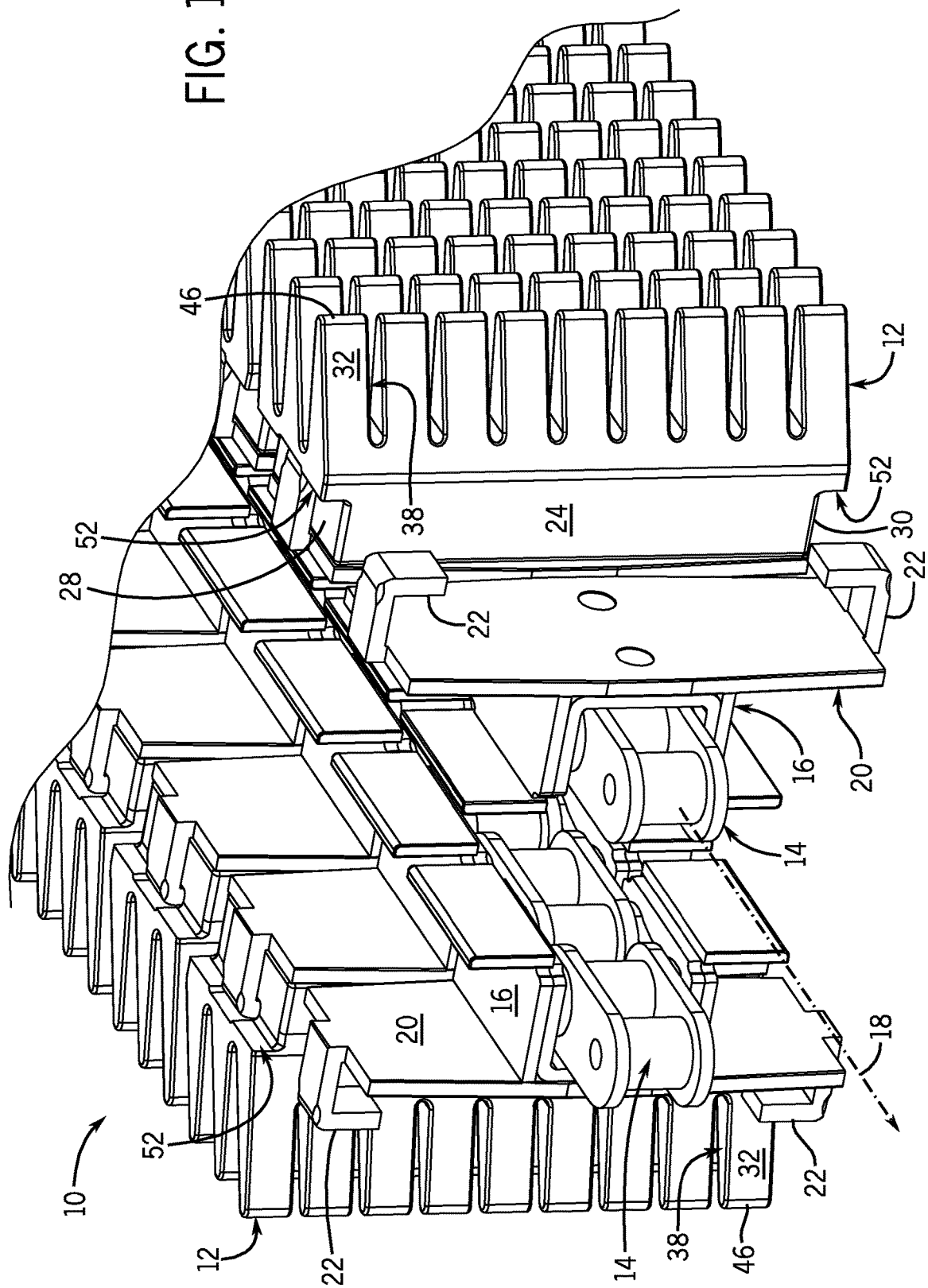
FIG. 1 is an isometric view of an example conveyor incorporating an example gripper attachment.

An example conveyor (10) is illustrated in FIG. 1 and incorporates an example embodiment of a gripper attachment (12). The general gripper attachment concept may be adapted to operate in conjunction with a variety of conveyor types and configurations. The example conveyor (10), however, includes a base chain (14), illustrated in the form of a roller chain, to which a series of adjacent top plates (16) are secured. As is understood by one of ordinary skill in the art, the base chain (14) allows the conveyor (10) to articulate as the base chain (14) translates along a travel path (18) during operation. A motor (not shown) typically rotates a sprocket (not shown) that is engaged with the base chain (14), thereby driving the conveyor (10).

Figure 2:
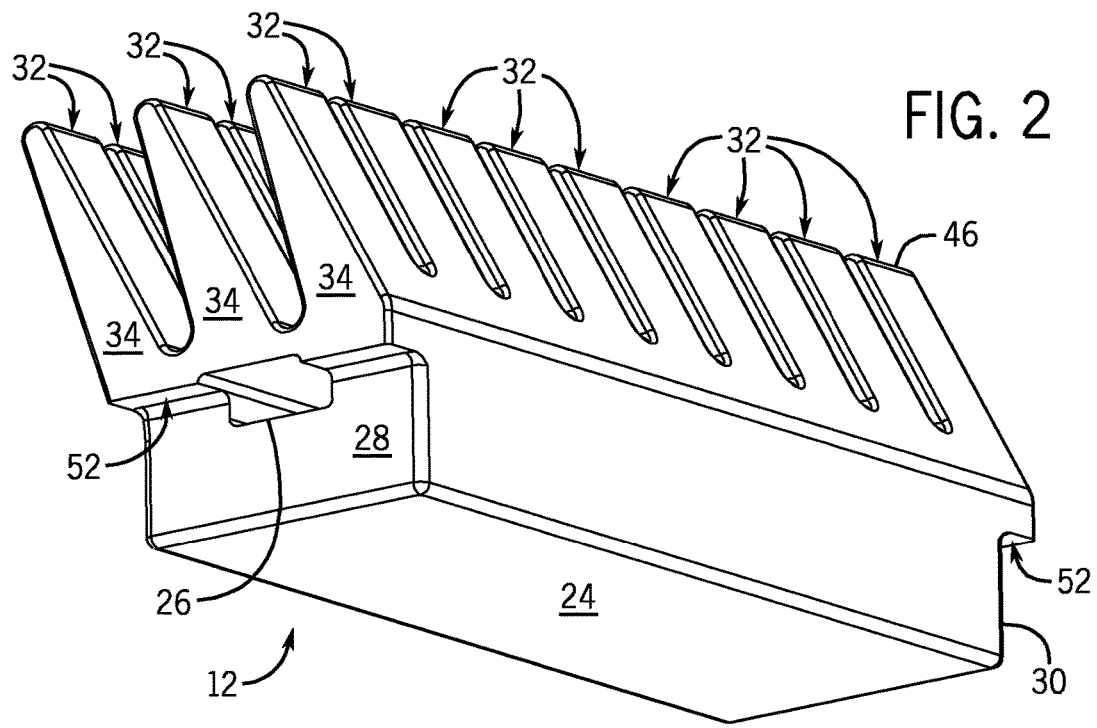
FIG. 2 is a back isometric view of the example gripper attachment.

Each example gripper attachment (12) is releasably coupled to a retainer (20) that, in the example embodiment, is in turn secured to the respective top plate (16). With additional reference to FIGS. 2 and 3, the retainer (20) includes arms (22) that extend away from the base chain (14) and capture the gripper attachment (12). As illustrated in the example embodiment, a base (24) defines a rectangular passage (26) that extends through ends (28, 30) of the base (24). The arms (22) of the retainer (20) seat into the passage (26) at both ends (28, 30) of the base (24) thereby selectively coupling the gripper attachment (12) to the base chain (14). The base chain (14), top plates (16), and retainer (20) may be made of metals, plastics, composites, and the like depending upon the particular application requirements.

Given the benefit of this disclosure, one skilled in the art will appreciate the various techniques and configurations available to couple a gripper attachment to the balance of a conveyor. For example, a gripper attachment may be directly coupled to a top plate by one or more fasteners (e.g., bolts) or the gripper attachment may be integrally molded with the conveyor, such as by overmolding the gripper attachment to a top plate.

Figure 3:
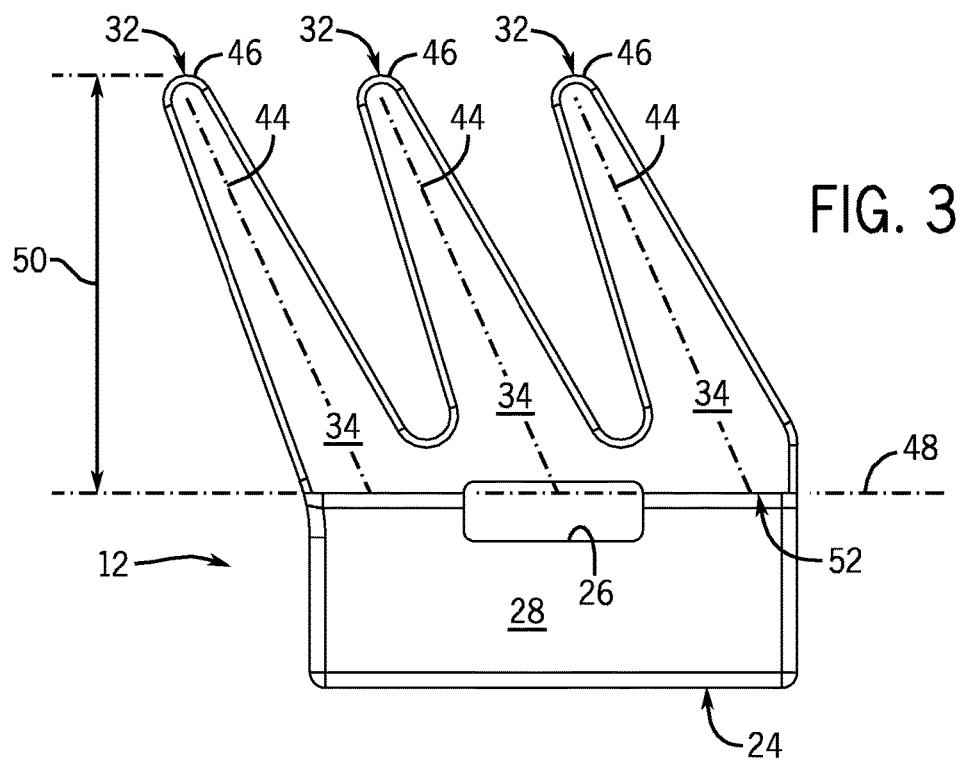
FIG. 3 is an end plan view of the example gripper attachment.
Figure 4:
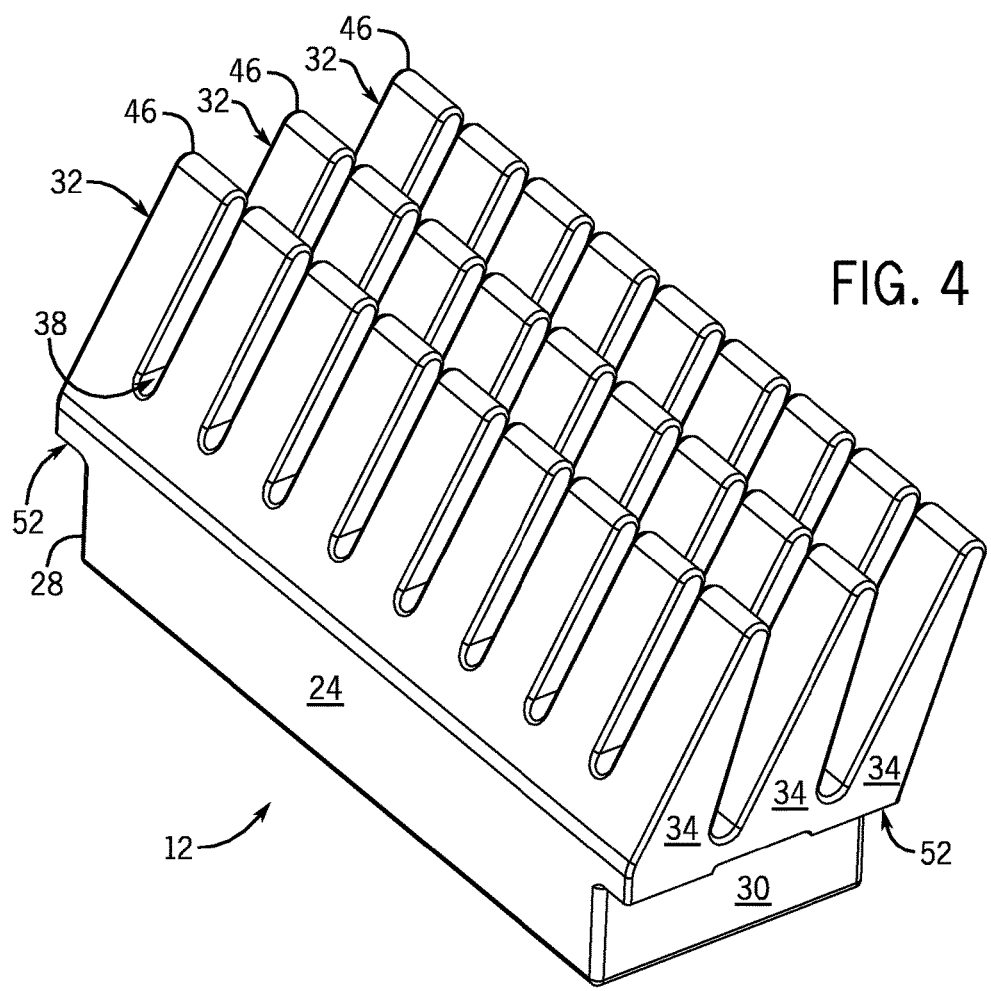
FIG. 4 is a front isometric view of the example gripper attachment.
Figure 5:
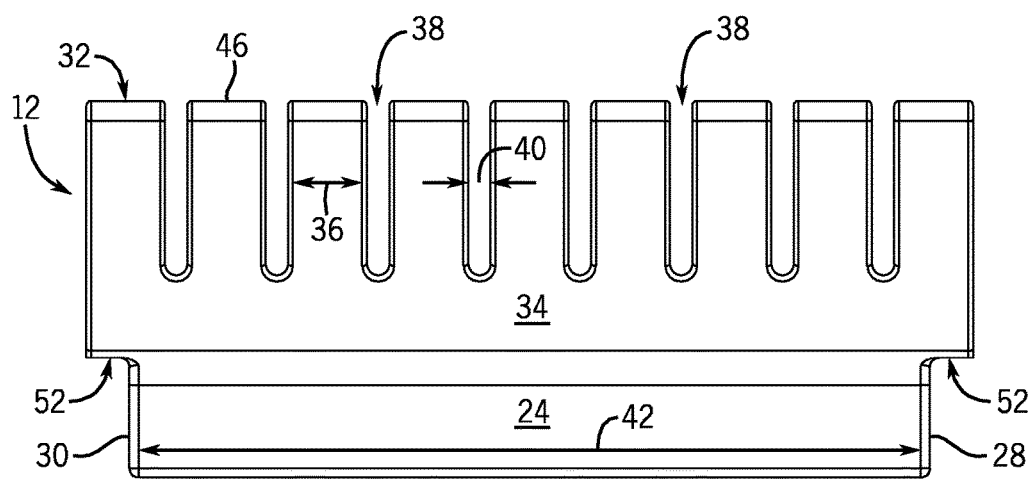
FIG. 5 is a front plan view of the example gripper attachment.

With further reference to FIGS. 2, 3, 4 and 5, the example embodiment of the gripper attachment (12) includes a plurality of resilient fingers (32) that are shown integral with and extending away from the base (24). As illustrated, three rows of fingers (32) are provided on the base (24). Each respective row of fingers (32) is substantially aligned between the ends (28, 30) of the base (24) generally defining a rib (34) along the base (24). As shown in FIG. 5, a width (36) of each finger (32) is generally defined by openings (38) formed along the rib (34), and as illustrated, a width (40) of the openings (38) is substantially uniform and less than the width (36) of a finger (32). In other words, the total width of the openings (38) along a single rib (34) is less than the total width of the fingers (32) along the same rib (34). Moreover, the width (36) of each finger (32) is less than a width (42) defined generally between the ends (28, 30) of the base (14)—that is, a single finger (32) does not extend completely along the width (42) of the example base (14).

In the example embodiment, the fingers (32) extend from the base (24) along a finger axis (44) to a tip (46). Each finger (32) tapers from the base (24) to the tip (46). The tips (46) are illustrated as having a rounded, arcuate form. As shown in FIG. 3, the finger axis (44) (and thus fingers (32)) are skewed relative to a plane (48) such that the fingers (32) are angled away from the path direction as the gripper attachment (12) moves along the travel path (18).

As shown, the example fingers (32) are generally uniform in construction and appearance. However, as one skilled in the art will appreciate in view of this disclosure, the fingers (32) may define a variety of form factors to accommodate the particular application requirements. For instance, an offset (50) from the base (24) may be varied (e.g., shorter, longer, alternating, etc.), the finger width (36) may vary between adjacent fingers, the opening width (40) may vary, the orientation of the fingers (32) may be altered (i.e., not substantially parallel or at other angles relative to the base (14)), and any combination of these and other modifications within the purview of one of ordinary skill when considering the present disclosure. Furthermore, the side profile (i.e., as viewed generally in FIG. 3) and the front profile (i.e., as viewed generally in FIG. 5) of each finger (32) can be modified (e.g., a narrower tip, a blunter tip, S-shaped, etc.).

In the example embodiment illustrated, the base (24) further includes an undercut (52) along each end (28, 30). The undercuts (52) extend beneath the ribs (34) such that several of the fingers (32) are partially cantilevered from the base (24). The undercuts (52) allow the arms (22) of the retainer (20) to be positioned behind the fingers (32) thereby generally shielding articles from directly contacting the retainer (20) during use.

The entire gripper attachment (12), or a portion thereof, may be made from a resilient material. Specifically, the fingers (32) are resilient such that the fingers (32) flex and generally conform to an article as the fingers (32) are brought into engagement with the article. Suitable materials for the gripper attachment (12) include neoprene having a Shore A hardness of approximately forty to fifty and ethylene propylene diene monomer rubber having a Shore A hardness of approximately fifty to eighty. Other suitable resilient materials include, but are not limited to, silicones, plastics, thermo-elastomers, and rubbers.

Figure 6:
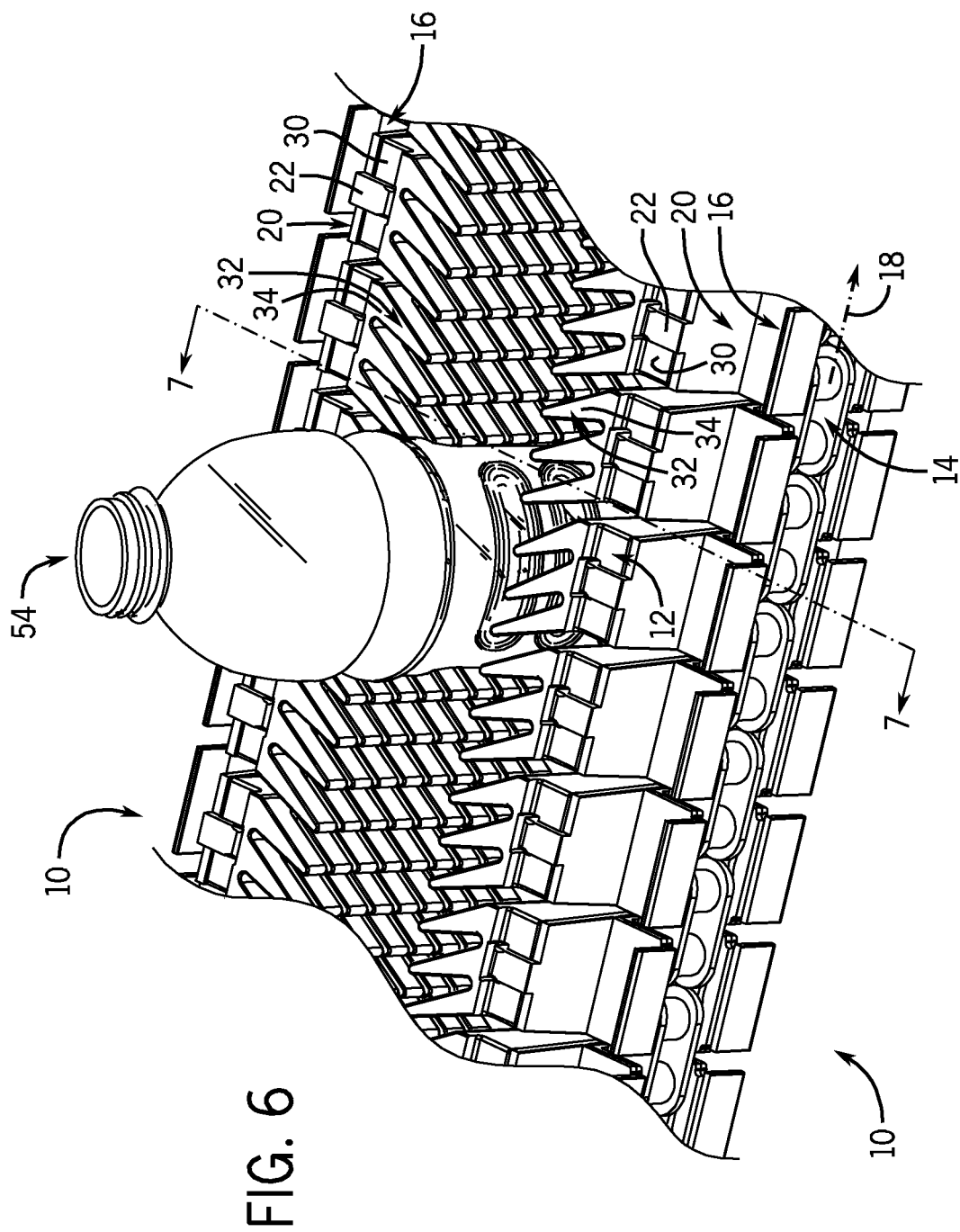
FIG. 6 is a partial isometric view illustrating the example gripper attachment engaging an example article.

Turning to FIGS. 6, 7, and 8, the example gripper attachment (12) is illustrated engaged with an example article (54) (e.g., a contoured bottle). During use, one or more gripper attachments (12), which may be coupled to one or more base chains (14), is/are moved into engagement with the article (54). A second base chain (14) and another series of gripper attachments (12) is illustrated, such that the opposing gripper attachments (12) can engage, flex, and restrain (e.g., clamp) the article (54) as the base chains (14) merge to a substantially parallel orientation.

With specific reference to FIGS. 7 and 8, each finger (32) of the gripper attachment (12) is able to flex substantially independently of an adjacent finger (32), thereby allowing a substantial portion of the gripper attachment (12) to engage the contours of the article (54). As the resilient fingers (32) come into engagement with the article (54), each finger (32) begins to deflect and flex from a natural, unengaged position. As a result, the resiliency of the fingers (32) helps restrain the article (54) during engagement. The article (54) can then be disengaged with the one or more gripper attachments (12) (e.g., as the parallel base chains (14) diverge), allowing the resilient fingers (32) to rebound back to the natural position of each finger (32). The gripper attachment (12) is then positioned to accommodate another article of similar or distinct form factor from the previous article (54).

One example alternative embodiment of a gripper attachment (58) is illustrated in FIG. 9. Again, three rows of fingers (60) extend from a base (62). Each respective row of fingers (60) is generally aligned between ends (64, 66) of the base (62). However, unlike the generally uniform fingers (32) shown in the first example embodiment, the fingers (60) illustrated in FIG. 9 include four distinct form factors.

A first alternative finger (60A) is generally similar to the finger (32) shown in FIG. 4, however, a width (68) of the first alternative finger (60A) is greater than other fingers (60) of the gripper attachment (58). A second alternative finger (60B) defines a tip (70) having an end face (72) that is generally planar. Furthermore, the end face (72) establishes an offset from the base (62) that is less than an offset of the first alternative finger (60A). A third alternative finger (60C) extends from the base (62) toward a tip (78) that is generally contoured to include a plurality of ridges (80) and valleys (82). The ridges (80) and valleys (82) are illustrated in substantially parallel orientations transverse to the rows of fingers (60). A fourth alternative finger (60D) is shown having an outside wall (84) that is skewed inward from the base (62) toward a tip (86), such that a lower portion (88) of the forth alternative finger (60D) has a greater cross-sectional area as compared to an upper portion (90). The second example gripper attachment (58) also includes smaller openings (92) and larger openings (94) between the various alternative fingers (60). As a result, the spacing between adjacent fingers (60) may not be uniform.

While there has been shown and described what is at present considered the preferred embodiments of the concept, it will be obvious to those skilled in the art that various additional changes and modifications can be made, given the benefit of this disclosure, without departing from the scope of the invention defined by the following claims.

We claim:

1. A gripper chain assembly, comprising:
   a first chain capable of traveling in a path direction;
   a first gripper attachment having a first base mounted to the first chain;
   a first plurality of resilient fingers defining at least one row of individual fingers extending from the first base and substantially aligned transversely to the path direction; and
   a second chain adjacent the first chain capable of traveling in the path direction;
   a second gripper attachment having a second base mounted to the second chain;
   a second plurality of resilient fingers defining at least one row of individual fingers extending from the second base toward the first plurality of resilient fingers, wherein when an article is between the first plurality of resilient fingers and the second plurality of resilient fingers, each of the fingers of the first and second plurality of resilient fingers substantially independently deflect and flex from a natural unengaged position to engage and generally conform to the article.

2. A gripper chain assembly as in claim 1, in which the first base extends from a first end to a second end;
   a first rib is integrally formed with the first base and substantially extends between the first end of the first base and the second end of the first base;
   openings of a first plurality of openings are spaced apart along the first rib and defining the first plurality of resilient fingers between the first end of the first base and the second end of the first base;
   a second rib is integrally formed with the first base and substantially extends between the first end of the first base and the second end of the first base; and
   openings of a second plurality of openings are spaced apart along the second rib and defining a second first plurality of resilient fingers between the first end of the first base and the second end of the first base;
   wherein at least one finger of at least one of the first plurality of resilient fingers and the second first plurality of resilient fingers is substantially independently flexible relative to an adjacent finger such that the at least one of the first plurality of resilient fingers and the second first plurality of resilient fingers is capable of generally conforming to an article when brought into engagement with the article.

3. The gripper chain assembly of claim 2, wherein the first rib and the second rib are substantially parallel.

4. The gripper chain assembly of claim 2, wherein at least one opening of the first plurality of openings and the second first plurality of openings are substantially parallel.

5. The gripper chain assembly of claim 2, wherein each resilient finger of the first plurality of resilient fingers extends away from the first base to a tip along a finger axis; and the finger axis is skewed relative to a plane defined by the first base.

6. The gripper chain assembly of claim 2, wherein at least one of the first plurality of resilient fingers and the second first plurality of resilient fingers are substantially parallel.

7. The gripper chain assembly of claim 2, wherein at least one of the first plurality of openings and the second plurality of openings are in the form of slots.

8. The gripper chain assembly of claim 2, wherein each resilient finger of the first plurality of resilient fingers defines a width different from an adjacent one of the resilient fingers of the first plurality of resilient fingers.

9. The gripper chain assembly of claim 2, wherein a total width of the first plurality of openings is less than a total width of the first plurality of resilient fingers.

10. The gripper chain assembly of claim 2, wherein at least one of the first end and the second end includes an undercut.

11. The gripper chain assembly of claim 2, wherein the base includes an undercut along the first end such that at least one of the first plurality of resilient fingers is cantilevered from the base.

12. The gripper chain assembly as in claim 1, in which the first plurality of resilient fingers extends from the first base is substantially aligned between a first end of the first base and a second end of the first base;
    wherein each resilient finger of the first plurality of resilient fingers defines a width that is less than a width defined between the first end of the first base and the second end of the first base; and
    wherein each resilient finger of the first plurality of resilient fingers is substantially independently flexible relative to an adjacent resilient finger such that the first plurality of resilient fingers are capable of generally conforming to an article when brought into engagement with the article.

13. The gripper chain assembly of claim 12, wherein each resilient finger of the first plurality of resilient fingers extends away from the first base to a tip along a finger axis; and the finger axis is skewed relative to a plane defined by the first base.

14. The gripper chain assembly of claim 12, wherein a sum of the widths of each of the first plurality of resilient fingers is approximately less than the width defined between the first end of the first base and the second end of the first base.

15. The gripper chain assembly of claim 12, wherein the first plurality of resilient fingers define a plurality of openings between adjacent resilient fingers of the first plurality of resilient fingers; and a width of at least one of the resilient fingers of the first plurality of resilient fingers is greater than a width of one of the plurality of openings.

16. The gripper chain assembly of claim 12, wherein at least one of the first end and the second end includes an undercut.

17. The gripper chain assembly of claim 12, wherein the first base includes an undercut along the first end such that at least one resilient finger of the first plurality of resilient fingers is cantilevered from the first base.

18. The gripper chain assembly of claim 1, wherein the first plurality of resilient fingers define a first plurality of openings between adjacent fingers; and a total width of the first plurality of resilient fingers is greater than a total width of the first plurality of openings.

19. The gripper chain assembly of claim 1, wherein the first chain is oriented substantially parallel to the second chain.

20. The gripper chain assembly of claim 1, wherein the first base includes an undercut; and the first chain includes a retainer that is positioned in the undercut.

21. The gripper chain assembly of claim 1, wherein the first base includes an undercut such that at least one of the first plurality of resilient fingers is cantilevered from the first base.

* * * * *